(12) United States Patent
Yamaguchi (10) Patent No.: US 8,096,200 B2
(45) Date of Patent: Jan. 17, 2012

(54) TRACTOR

(75) Inventor: Tatsuo Yamaguchi, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 993 days.

(21) Appl. No.: 11/988,421

(22) PCT Filed: Sep. 30, 2005

(86) PCT No.: PCT/JP2005/018191
§ 371 (c)(1),
(2), (4) Date: Jan. 7, 2008

(87) PCT Pub. No.: WO2007/004311
PCT Pub. Date: Jan. 11, 2007

(65) Prior Publication Data
US 2009/0223312 A1  Sep. 10, 2009

(30) Foreign Application Priority Data

Jul. 6, 2005  (JP) ................................. 2005-198083

(51) Int. Cl.
*B60K 17/28* (2006.01)
(52) U.S. Cl. ........................................ 74/15.4; 74/15.86
(58) Field of Classification Search .................. 74/15.4, 74/15.6, 15.69, 15.8–15.88
See application file for complete search history.

(56) References Cited

U.S. PATENT DOCUMENTS

| 4,292,855 | A | * | 10/1981 | Murayama | 74/15.4 |
| 4,546,661 | A | * | 10/1985 | Weis et al. | 74/15.4 |
| 6,073,502 | A | * | 6/2000 | Wallace | 74/15.86 |
| 6,199,653 | B1 | * | 3/2001 | Matsufuji et al. | 180/233 |

FOREIGN PATENT DOCUMENTS

| JP | 2-81718 | 3/1990 |
| JP | 7-232570 | 9/1995 |
| JP | 7-51393 | 11/1995 |
| JP | 8-80754 | 3/1996 |
| JP | 2004-345475 | 12/2004 |

* cited by examiner

*Primary Examiner* — William C Joyce
(74) *Attorney, Agent, or Firm* — Jordan and Hamburg LLP (57) ABSTRACT

In a tractor which detachably mounts a PTO portion on a transmission portion, a PTO clutch mechanism is arranged in the inside of the PTO portion. Accordingly, a specification which includes the PTO clutch mechanism or a specification which includes no PTO clutch mechanism is selectable depending on whether the PTO clutch mechanism is preliminarily assembled in the PTO portion or not, in a stage at which the PTO portion is assembled. It is also later possible to easily complete assembly by merely mounting the PTO portion on the transmission portion. Further, by reversing the assembly steps, it is possible to easily perform maintenance of the PTO clutch mechanism or other related components.

2 Claims, 9 Drawing Sheets

TRACTOR

BACKGROUND OF THE INVENTION

1. Field of the Invention

The present invention relates to the structure of a PTO portion of a tractor.

2. Description of the Related Art

Conventionally, as one mode of a tractor, there has been known a tractor in which a PTO clutch is mounted in the inside of a rear housing and, at the same time, the PTO clutch adopts a friction multi-disk-type hydraulically operated clutch structure (for example, see patent document 1 (JP-UM-B-7-51393).

Here, the PTO clutch is communicably connected with a hydraulic pump by way of a clutch changeover valve. The clutch changeover valve is allowed to perform the changeover operation using a manipulation jig and can take a half-clutch state.

By supplying working oil to the PTO clutch so as to bring the PTO clutch into the connection state in this manner, it is possible to transmit the power to a PTO shaft. In this case, the clutch changeover valve is temporarily brought into the half clutch state by way of the clutch changeover valve using the manipulation jig and, thereafter, the PTO clutch is brought into a complete clutch connection state so as to prevent the power from being rapidly transmitted to the PTO shaft.

Further, as one mode of a tractor, there has been known a tractor in which while an engine is arranged in a prime mover portion, an inner-and-outer duplicate shaft structure is arranged in the clutch portion, wherein the inner-and-outer duplicate shaft structure is constituted of an inner drive shaft which extends in the longitudinal direction and a cylindrical outer drive shaft which surrounds an outer periphery of the inner drive shaft. The inner drive shaft is interlockingly connected with the above-mentioned engine by way of a PTO clutch, while the outer drive shaft is interlockingly connected with the engine by way of a traveling clutch thus providing the dual clutch structure which includes the PTO clutch and the traveling clutch (for example, see patent document 2 (JP-A-8-80754)).

Further, a clutch pedal is mechanically and interlockingly connected with the PTO clutch by way of a rod or the like, wherein it is possible to perform the connection and disconnection operation of the PTO clutch by performing the step-in manipulation of the clutch pedal.

Here, the above-mentioned inner drive shaft is interlockingly connected with the PTO portion by way of a PTO-system power transmission mechanism arranged in the inside of a transmission portion. Further, the above-mentioned outer drive shaft is interlockingly connected with a pair of left and right rear wheels by way of a traveling-system power transmission mechanism arranged in the inside of the transmission portion.

However, the tractor disclosed in the above-mentioned patent literature 1 has following drawbacks.

(1) Since the PTO clutch is incorporated in the inside of a rear housing, it is difficult to separately provide a specification which includes the PTO clutch and a specification which has no PTO clutch while using the rear housing in common.

(2) The structure which temporarily brings the PTO clutch into the half clutch state by way of the clutch changeover valve using the manipulation jig and, thereafter, brings the PTO clutch into the complete clutch connection state is complicated and pushes up a manufacturing cost.

On the other hand, the tractor disclosed in the above-mentioned patent literature 2 has following drawbacks.

(1) Since the PTO clutch is arranged in the inside of the clutch portion, it is difficult to mount and dismount the PTO clutch. As a result, it is difficult to separately provide a specification which includes the PTO clutch and a specification which has no PTO clutch while using the clutch housing in common.

(2) The inner drive shaft which is interlockingly connected with the PTO portion by way of the PTO-system power transmission mechanism and the outer drive shaft which is interlockingly connected with the pair of left and right rear wheels by way of the traveling-system power transmission mechanism are formed into the inner-and-outer duplicate shaft structure and are arranged in the inside of the transmission portion and hence, there arises a drawback that the structure in the inside of the transmission portion becomes complicated and large-sized thus pushing up a manufacturing cost.

(3) The inner drive shaft is interlockingly connected with the engine by way of the PTO clutch and, at the same time, the outer drive shaft which is interlockingly connected with the engine by way of the traveling clutch thus forming the dual clutch structure which includes the PTO clutch and the traveling clutch and such dual clutch is arranged in the clutch portion and hence, there arises a drawback that the clutch portion becomes complicated and large-sized thus pushing up a manufacturing cost.

SUMMARY OF THE INVENTION (1) According to a first aspect of the present invention, in a tractor which detachably mounts a PTO portion on a transmission portion, a PTO clutch mechanism is arranged in the inside of the PTO portion.

In this manner, since the PTO clutch mechanism is arranged in the inside of the PTO portion which is detachably mounted on the transmission portion, it is possible to easily determine the specification which includes the PTO clutch mechanism or the specification which includes no PTO clutch mechanism depending on whether the PTO clutch mechanism is preliminarily assembled in the PTO portion or not in a stage that the PTO portion is assembled and, at the same time, it is possible to easily complete the assembling by merely mounting the PTO portion on the transmission portion.

Further, by taking steps opposite to the above-mentioned steps, it is possible to easily perform the maintenance of the PTO clutch mechanism or the like.

(2) According to a second aspect of the present invention, the PTO clutch mechanism is detachably mounted on the PTO portion.

In this manner, by detachably mounting the PTO clutch mechanism on the PTO portion, it is possible to provide the specification which includes the PTO clutch mechanism or the specification which includes no PTO clutch mechanism in a state that the PTO portion is used in common.

Further, the PTO clutch mechanism is detachably mounted on the PTO portion and the PTO portion is detachably mounted on the transmission portion and hence, it is possible to easily perform the assembling operation and the disassembling operation whereby the maintenance operation can be performed easily.

(3) According to a third aspect of the present invention, a manual manipulating jig is interlockingly connected to the PTO clutch mechanism by way of the interlocking mechanism, and the manual manipulating jig is arranged in the vicinity of a driver's seat.

In this manner, the manual manipulating jig which is interlockingly connected to the PTO clutch mechanism by way of the interlocking mechanism is arranged in the vicinity of the driver's seat and hence, it is possible to mechanically manipulate the PTO clutch mechanism by way of the interlocking mechanism by manipulating the manual manipulating jig.

As a result, it is possible to prevent the rapid transmission of power to the PTO shaft in an initial stage and hence, a load applied to a working machine which receives the power from the PTO shaft can be suitably reduced.

Further, an operator can manipulate a steering manipulation jig with one hand and can manipulate the manual manipulating jig with another hand. Accordingly, at the time of turning a tractor body by manipulating the steering manipulation jig, by manipulating the manual manipulating jig, it is possible to turn the tractor body in a state that the PTO clutch mechanism is disconnected so as to release the transmission of the power to the working machine. On the other hand, after turning the tractor body, by manipulating the manual manipulating jig, it is possible to connect the PTO clutch mechanism with the manual manipulating jig so as to restore the working machine into a state which allows the transmission of the power to the working machine thus allowing the working machine to resume a work.

Accordingly, it is possible to improve the manipulability of the steering manipulation jig and the manual manipulating jig thus enhancing the working efficiency.

BRIEF DESCRIPTION OF THE DRAWINGS

FIG. 4A to FIG. 4C are views showing a advancing/backing changeover mechanism, wherein

DESCRIPTION OF THE PREFERRED EMBODIMENTS

Figure 1:
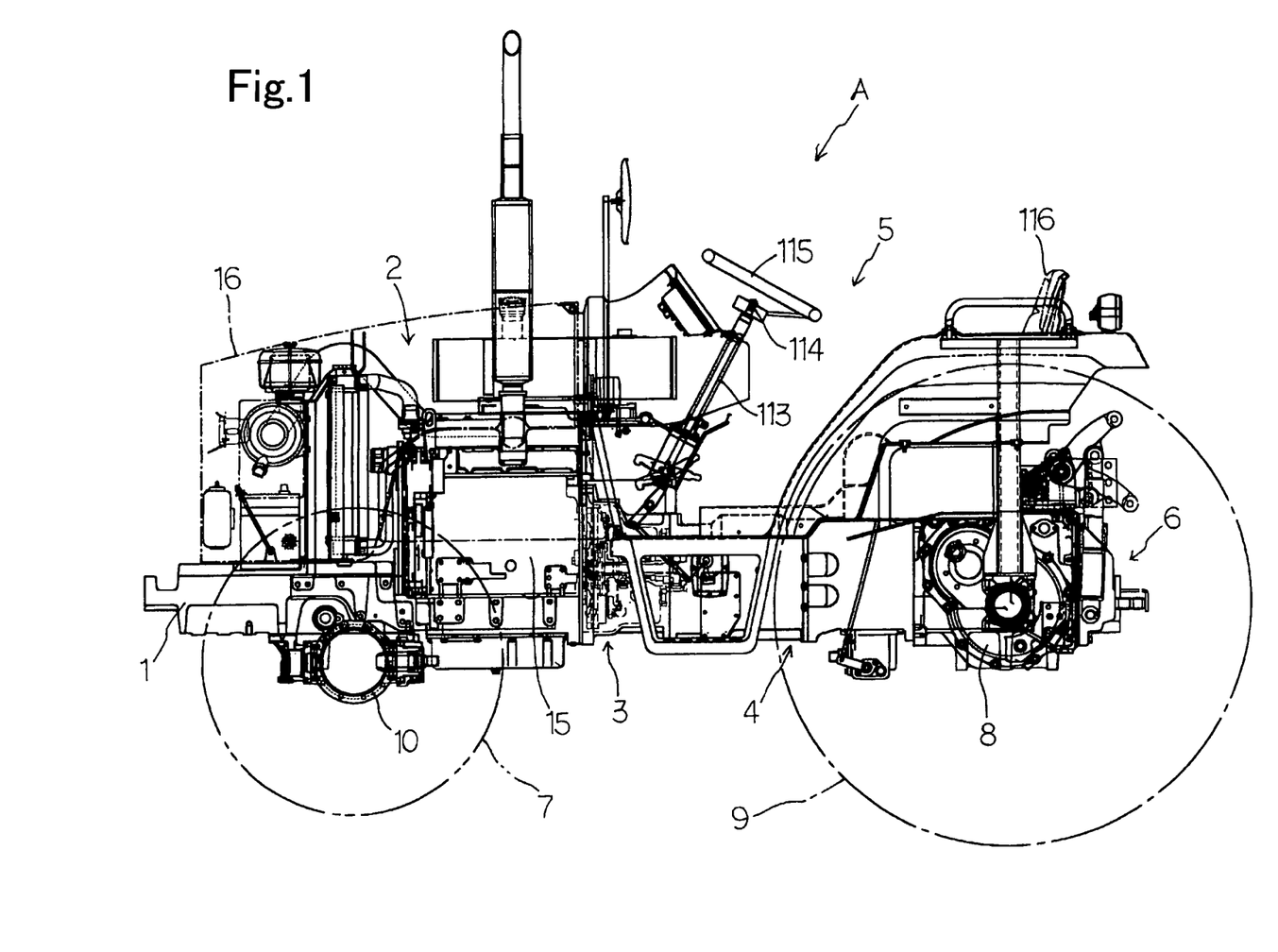
FIG. 1 is a side view of a tractor according to the present invention.

Symbol A shown in FIG. 1 indicates a tractor according to the present invention. The tractor A is configured such that a prime mover portion 2 is mounted on a body frame 1, a transmission portion 4 is interlockingly connected to the prime mover portion 2 by way of a clutch portion 3, a driving portion 5 is arranged above the transmission portion 4, a PTO transmission portion 6 which constitutes a PTO portion having a transmission function is detachably and interlockingly connected to a rear portion of the transmission portion 4, a pair of left and right front wheels 7, 7 are interlockingly connected to front axle casings 10 arranged below the body frame 1 and a pair of left and right rear wheels 9, 9 are interlockingly connected to the transmission portion 4 by way of rear axle casings 8, 8.

Hereinafter, the constitutions of the above-mentioned [prime mover portion 2], [clutch portion 3], [transmission portion 4], [driving portion 5] and [PTO transmission portion 6] are explained in a specific manner in this order.

[Prime Mover 2]

The prime mover portion 2 is constituted such that, as shown in FIG. 1, an engine 15 or the like is mounted on the body frame 1 and the engine 15 is covered with a hood 16 which can be opened and closed.

[Clutch Portion 3]

Figure 2:
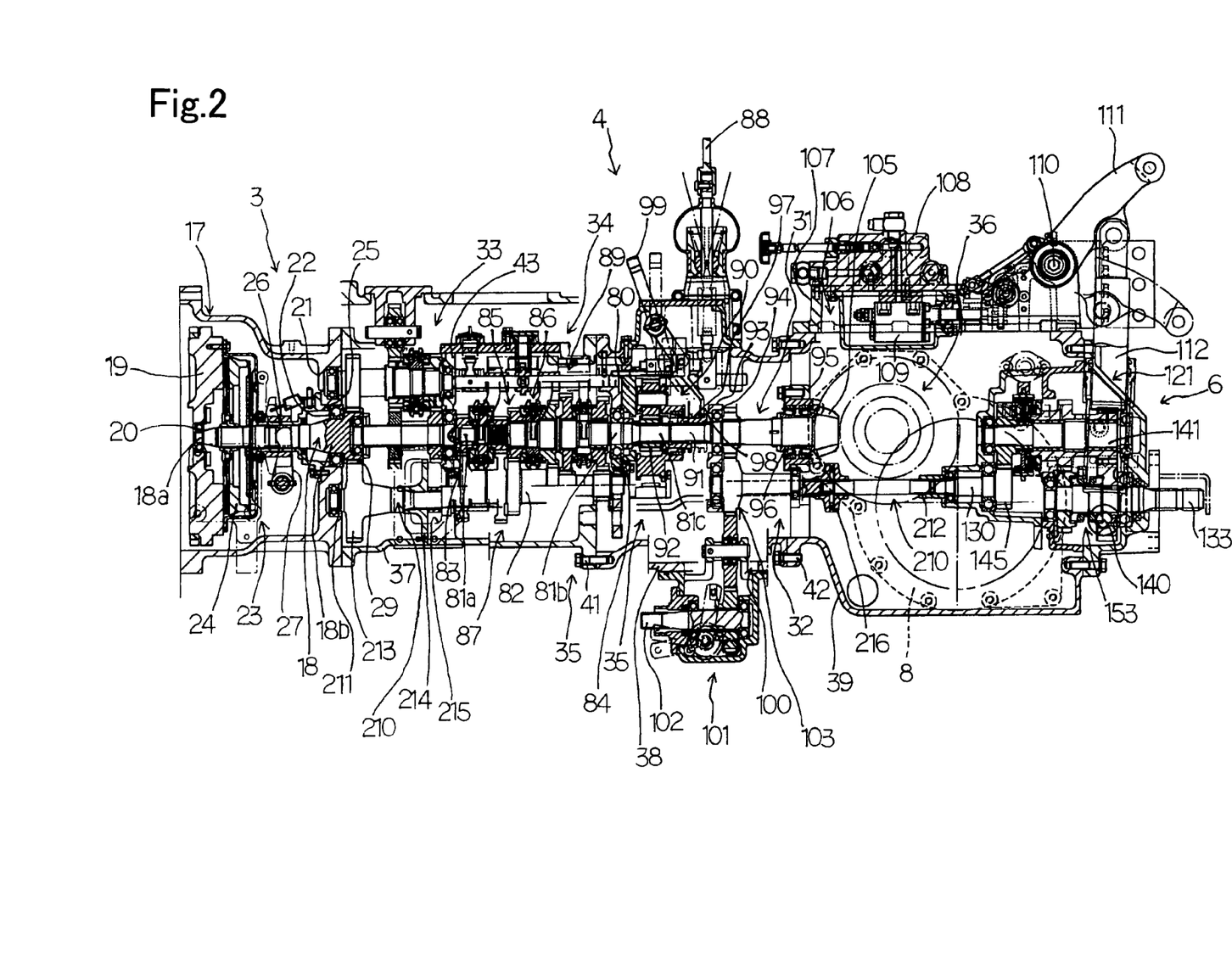
FIG. 2 is an explanatory cross-sectional side view of a clutch portion and a transmission portion.
Figure 3:
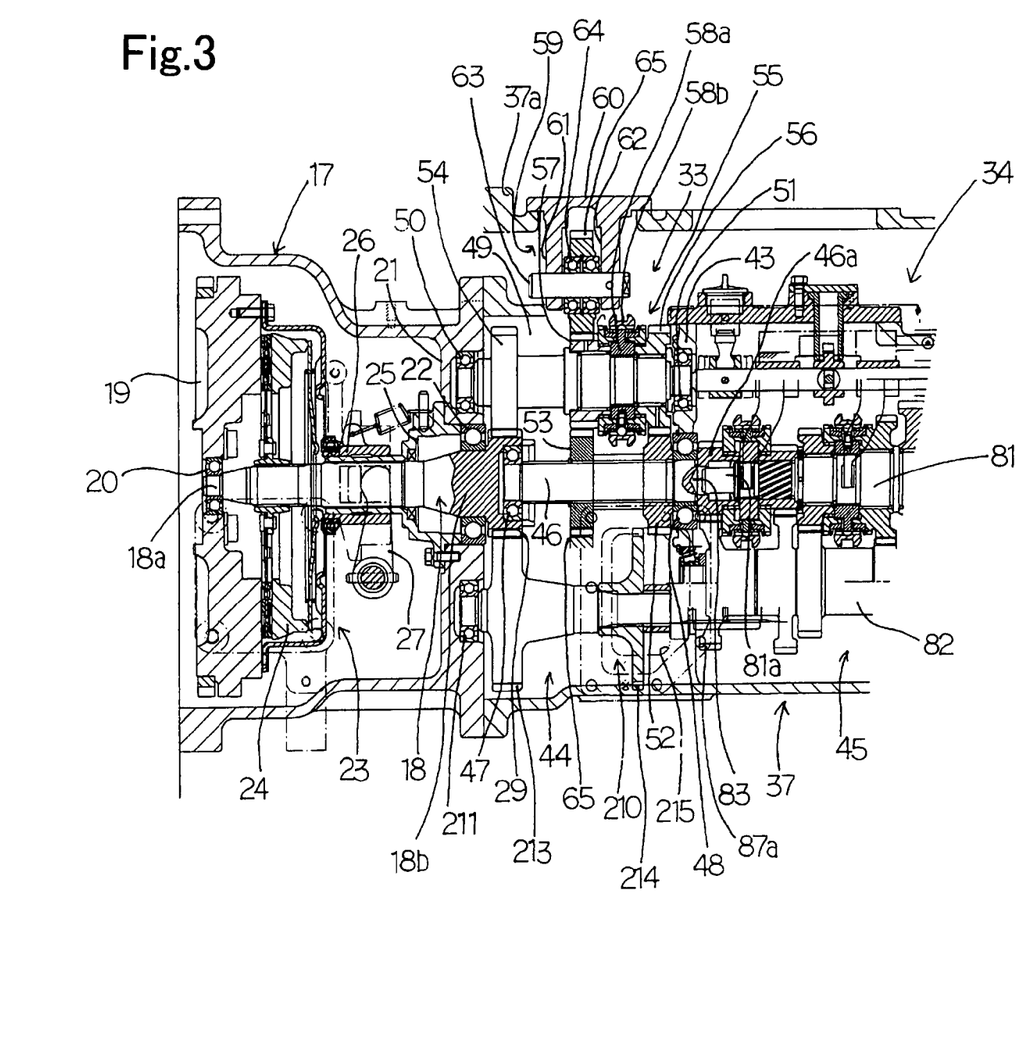
FIG. 3 is an explanatory cross-sectional side view of the clutch portion.

The clutch portion 3 is configured such that, as shown in FIG. 2 and FIG. 3, a drive shaft 18 which is extended in the longitudinal direction is rotatably supported in the inside of a clutch housing 17. With respect to the drive shaft 18, while a front end portion 18a thereof is pivotally supported on a center portion of a flywheel 19 which is arranged at a front portion in the inside of the clutch housing 17 by way of a front bearing 20, a rear end portion 18b thereof is pivotally supported on a support wall body 21 which is formed along a rear-end peripheral portion of the clutch housing 17 by way of a rear bearing 22.

Further, a clutch 23 is arranged around a periphery of the front portion of the drive shaft 18. The flywheel 19 and the drive shaft 18 are connected with each other by way of the clutch 23 in a connectable and disconnectable manner.

That is, in the clutch 23, a clutch main body 24 is connected with the flywheel 19. A cylindrical operating member 26 is slidably mounted on an outer peripheral surface of a cylindrical support member 25 which is arranged at a front outer periphery of the drive shaft 18 and supports a midst portion of the drive shaft 18 in a longitudinal direction. Further, a clutch pedal (not shown in the drawings) which is disposed at the driving portion 5 described later is interlockingly connected with the operating member 26 by way of a clutch operating arm 27.

Due to such a constitution, when the clutch pedal is stepped in, a pushing action which is applied to the clutch body 24 by the operating member 26 by way of the clutch operating arm 27 is released and hence, the clutch 23 is disconnected.

Here, to a rear-end peripheral portion of the clutch housing 17, a front peripheral portion of a main transmission casing 37 of the transmission portion 4 described later is detachably connected. Further, in the inside of the main transmission casing 37, a distribution power transmission gear 29 which constitutes a distribution power transmission body is arranged. The distribution power transmission gear 29 is formed such that a rear end portion 18b of the drive shaft 18 is extended rearwardly and the distribution power transmission gear 29 is integrally formed on the extended portion.

[Transmission Portion 4]

The transmission portion 4 is, as shown in FIG. 2 and FIG. 3, configured such that, in the inside of a transmission casing 30 which extends in the longitudinal direction and is formed in a cylindrical shape, a traveling-system power transmission mechanism 31 which extends in the longitudinal direction and a PTO-system power transmission mechanism 32 are arranged in parallel to each other.

Further, in the traveling-system power transmission mechanism 31, an advancing/backing changeover mechanism 33 which sequentially performs an advancing/backing changeover operation from a front side to a rear side, a main transmission mechanism 34 which performs the main transmission of the power which is changed over by the advancing/backing changeover mechanism 33, a sub transmission mechanism 35 which performs the sub transmission of the power which is obtained after the main transmission by the main transmission mechanism 34, and a differential mechanism 36 which transmits the power which is obtained after the sub transmission by the sub transmission mechanism 35 to the left and right rear wheels 9, 9 in a distributed manner are arranged.

Further, the above-mentioned advancing/backing changeover mechanism 33 has a start end portion thereof interlockingly connected with the distribution power transmission gear 29 which is integrally formed on the drive shaft 18.

Further, while the PTO-system power transmission mechanism 32 has a start end portion thereof interlockingly connected with the distribution power transmission gear 29 which is integrally formed on the above-mentioned drive shaft 18, the PTO-system power transmission mechanism 32 has a terminal end portion thereof interlockingly connected with the PTO transmission portion 6 described later.

Due to such a constitution, the power which is transmitted from the engine 15 to the drive shaft 18 is transmitted to the traveling-system power transmission mechanism 31 and the PTO-system power transmission mechanism 32 in a distributed manner by way of the distribution power transmission gear 29.

Further, the transmission casing 30 is, as shown in FIG. 2, formed in a three split-constitution consisting of a main transmission casing 37 which incorporates the advancing/backing changeover mechanism 33 and the main transmission mechanism 34 therein, a sub transmission casing 38 which incorporates the sub transmission mechanism 35 therein, and a differential casing 39 which incorporates the differential mechanism 36 therein. A front-end peripheral portion of the main transmission casing 37 is detachably connected to the rear-end peripheral portion of the above-mentioned clutch housing 17 using connecting bolts (not shown in the drawings), a front-end peripheral portion of the sub transmission casing 38 is detachably connected to a rear-end peripheral portion of the main transmission casing 37 using connecting bolts 41, and a front-end peripheral portion of the differential casing 39 is detachably connected to a rear-end peripheral portion of the sub transmission casing 38 using connecting bolts 42.

Further, the main transmission casing 37 mounts, as shown in FIG. 3, an inner support wall body 43 on a midst portion thereof. With the use of the inner portion support wall body 43, the inside of the main transmission casing 37 is split in two thus forming a front chamber 44 and a rear chamber 45. On the other hand, the above-mentioned advancing/backing changeover mechanism 33 is arranged in the inside of the front chamber 44, and the main transmission mechanism 34 is arranged in the inside of the rear chamber 45.

In the advancing/backing changeover mechanism 33, as shown in FIG. 3, between the support wall body 21 which is formed along the rear-end peripheral portion of the above-mentioned clutch housing 17 and the inner support wall body 43, an advancing/backing changeover input shaft 46 which extends in the longitudinal direction is extended rotatably by way of front and rear bearings 47, 48. On the other hand, between an upper portion of the above-mentioned support wall body 21 and an upper portion of the above-mentioned inner support wall body 43, an advancing/backing changeover output shaft 49 which extends in the longitudinal direction is extended rotatably by way of front and rear bearings 50, 51.

Further, the advancing/backing changeover input shaft 46 is arranged coaxially with the drive shaft 18 and an advancing input gear 52 and a backing input gear 53 are integrally mounted on the above-mentioned advancing/backing changeover input shaft 46.

Further, on the advancing/backing changeover output shaft 49, a distribution input gear 54 which is meshed with the above-mentioned distribution power transmission gear 29 and an advancing/backing changeover body 55 which is capable of changing over the input drive force between the advancing side and the backing side are mounted.

Further, the advancing/backing changeover body 55 allows an advancing output gear 56 and a backing output gear 57 to be rotatably mounted on the advancing/backing changeover output shaft 49 in a state that the advancing output gear 56 and the backing output gear 57 are arranged close to each other. Further, between both output gears 56, 57, a advancing/backing changeover receiving member 58a is integrally fitted on the advancing/backing changeover output shaft 49 and, at the same time, an advancing/backing changeover slide member 58b is mounted on an outer peripheral surface of the advancing/backing changeover receiving member 58a in a state that the advancing/backing changeover slide member 58b is slidable in the axial direction.

In this manner, the advancing/backing changeover slide member 58b can perform the changeover operation to provide an advancing changeover state in which the advancing/backing changeover slide member 58b is meshed with and connected with the advancing output gear 56 and a backing changeover state in which the advancing/backing changeover slide member 58b is meshed with and connected with the backing output gear 56, and a neutral position in which the advancing/backing changeover slide member 58b is meshed with and connected with neither one of the output gears 56, 57.

Figure 4A:
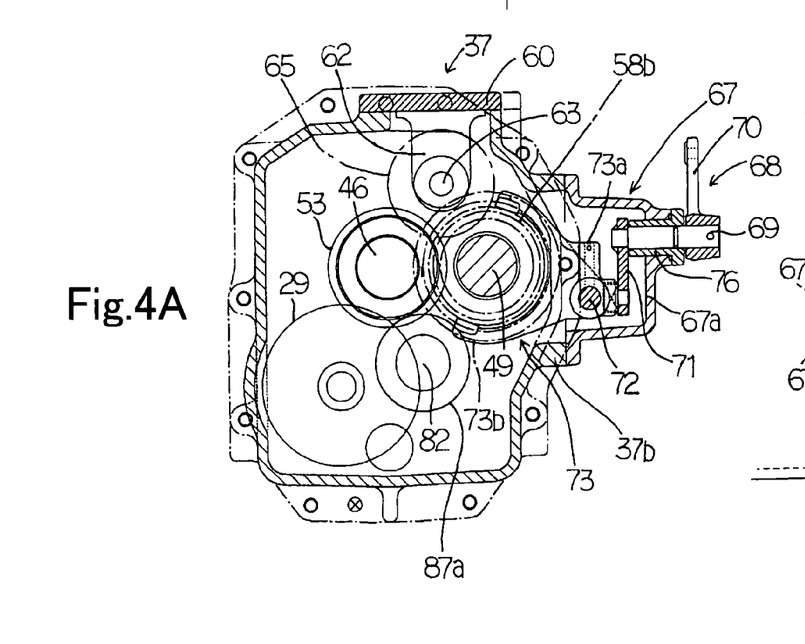
FIG. 4A is an explanatory cross-sectional back view.
Figure 4B:
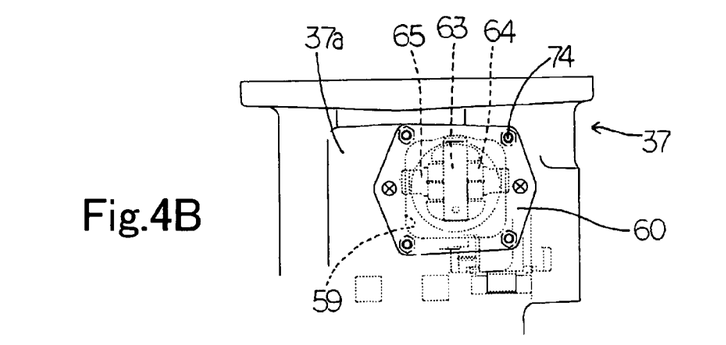
FIG. 4B is a plan view showing an appearance of the advancing/backing changeover mechanism.

Further, as shown in FIG. 3, FIG. 4A and FIG. 4B, an opening portion 59 is formed in a ceiling portion 37a of the main transmission casing 37. The opening portion 59 is closed by a lid body 60 in a state that the opening portion 59 can be opened and closed. On an inner surface of the lid body 60, a pair of front and rear shaft support members 61, 62 are mounted in a state that the shaft support members 61, 62 extend vertically downwardly. A gear support shaft 63 which has an axis thereof directed in the longitudinal direction is extended between both shaft support members 61, 62 and a counter gear 65 is rotatably supported on the gear support shaft 63 by way of a bearing 64. Numeral 74 indicates a lid mounting bolt.

Further, the above-mentioned counter gear 65 is, as shown in FIG. 3 and FIG. 4, in a state that the lid body 60 is mounted in the opening portion 59 of the main transmission casing 37 in a lid-closed state, meshed with both of the above-mentioned backing input gear 53 and backing output gear 57 simultaneously and hence, the power for backing is transmitted to the backing input gear 53 from the backing output gear 57 by way of the counter gear 65. On the other hand, in a state that the lid 60 is removed from the opening portion 59, the connection between the backing output gear 57 and the backing input gear 53 is resolved.

Here, the advancing output gear 56 is meshed with the advancing input gear 52.

Figure 4C:
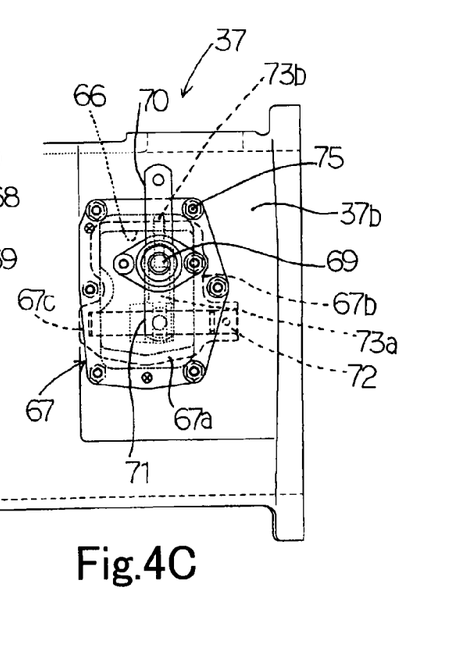
FIG. 4C is a side view showing the appearance of the advancing/backing changeover mechanism.

Further, as shown in FIG. 4A and FIG. 4C, an opening portion 66 is formed in a right side wall of the main transmission casing 37 and a cap-like case body 67 is detachably mounted in the opening portion 66. A start end portion of the advancing/backing changeover mechanism 68 is interlockingly connected with an advancing/backing changeover lever (not shown in the drawings) which is provided to the driving portion 5. On the other hand, a terminal end portion of the advancing/backing changeover mechanism 68 is interlockingly connected with the above-mentioned advancing/backing changeover slide member 58b and, at the same time, the terminal end portion is supported on the above-mentioned casing body 67. Numeral 75 indicates casing body mounting bolts.

That is, at the terminal end portion of the advancing/backing changeover mechanism 68, a support shaft 69 which has an axis thereof directed in the lateral direction is pivotally supported on an upper portion of a side wall 67a of the casing body 67 by way of a boss portion 76. A proximal end portion of a manipulation arm 70 which extends vertically is mounted on a right end portion of the support shaft 69 which projects outwardly from the side wall 67a, while a proximal end portion of operating arm 71 which extends vertically is mounted on a left end portion of the support shaft 69 which projects inwardly from the side wall 67a.

Further, a fork support shaft 72 which extends in the longitudinal direction is extended between lower portions of the front and rear walls 67b, 67c of the casing body 67. A proximal portion 73a of an advancing/backing changeover fork 73 is slidably fitted on the fork support shaft 72. A distal end portion of the operating arm 71 is interlockingly connected with the proximal portion 73a. Further, a distal-end fork portion 73b of the advancing/backing changeover fork 73 is fitted on an outer peripheral surface of the above-mentioned advancing/backing changeover slide member 58b.

In this manner, by manipulating the advancing/backing changeover lever provided to the driving portion 5, it is possible to allow the advancing/backing changeover slide member 58b to assume the advancing changeover state or the backing changeover state by way of the advancing/backing changeover mechanism 68.

Further, when the advancing/backing changeover slide member 58b is shifted to the advancing changeover state, the power transmitted to the drive shaft 18 from the engine 15 is transmitted to the advancing/backing changeover input shaft 46 by way of the distribution power transmission gear 29→the distribution input gear 54→the advancing/backing changeover output shaft 49→the advancing output gear 56→the advancing input gear 52→the advancing/backing changeover input shaft 46 so as to allow the advancing/backing changeover input shaft 46 to perform the advancing-side rotation, that is, the normal rotation.

On the other hand, when the advancing/backing changeover slide member 58b is shifted to the backing changeover state, the power transmitted to the drive shaft 18 from the engine 15 is transmitted to the advancing/backing changeover input shaft 46 by way of the distribution power transmission gear 29→the distribution input gear 54→the advancing/backing changeover output shaft 49→the backing output gear 57→the counter gear 65→the backing input gear 53→the advancing/backing changeover input shaft 46 so as to allow the advancing/backing changeover input shaft 46 to perform the backing-side rotation, that is, the reverse rotation.

The main transmission mechanism 34 is, as shown in FIG. 2, arranged in the inside of a rear chamber 45 of the main transmission casing 37. Between a rear end portion of the advancing/backing changeover input shaft 46 and a shaft support wall forming body 80 which is formed at a front portion in the inside of the sub transmission casing 38, a main-transmission main shaft 81 which extends in the longitudinal direction is rotatably extended. On the other hand, between the above-mentioned inner support wall body 43 and the above-mentioned shaft support wall forming body 80, a main-transmission sub shaft 82 which extends in frontward in the longitudinal direction is rotatably extended in parallel with the above-mentioned main-transmission main shaft 81.

Further, the main-transmission main shaft 81 has a distal end portion 81a thereof fitted in and supported by a fit/support recessed portion 83 formed in a center portion of a rear end of the advancing/backing changeover input shaft 46 and a rear portion 81b thereof supported by the shaft support wall forming body 80 by way of a bearing 84. That is, the main-transmission main shaft 81 is arranged coaxially with the drive shaft 18 and the advancing/backing changeover input shaft 46.

Further, a plurality of main-shaft-side transmission gears are rotatably and concentrically mounted on the main-transmission main shaft 81 thus forming a main-shaft-side transmission gear group 85. A plurality of transmission bodies are axially slidably fitted on the main-transmission main shaft 81 between respective main-shaft-side gears thus forming a transmission body group 86. Further, the main-shaft-side transmission gear which is meshed with and connected with any one of the transmission bodies is interlockingly connected with the main-transmission main shaft 81 by way of the transmission body.

On the other hand, a plurality of sub-shaft-side transmission gears are concentrically mounted on the main-transmission sub shaft 82 thus forming a sub-shaft-side transmission gear group 87. The respective sub-shaft-side transmission gears are respectively meshed with the oppositely facing main-shaft-side transmission gears, wherein the sub-shaft-side transmission gear 87a is meshed with the main-shaft-side transmission gear 46a which is integrally formed with a rear end portion of the advancing/backing changeover input shaft 46.

In this manner, the power transmitted to the advancing/backing changeover input shaft 46 is transmitted to the respective main-shaft-side transmission gears by way of the main-shaft-side transmission gear 46a→the sub-shaft-side transmission gear 87a→the main-transmission sub shaft 82→the respective sub-shaft-side transmission gears→the respective main-shaft-side transmission gears which are meshed with the respective sub-shaft-side transmission gears, whereby it is possible to transmit the power to the main-transmission main shaft 81 by way of any one of transmission bodies in a gear-changed state.

Here, the above-mentioned transmission body group 86 is, as shown in FIG. 2, interlockingly connected with the main transmission lever 88 mounted on the sub transmission casing 38 by way of a main transmission manipulation mechanism 89, wherein by manipulating the main transmission lever 88, the desired transmission body in the inside of the transmission body group 86 is slidably operated by way of the main transmission manipulation mechanism 89 thus performing the main transmission in plural stages.

The sub transmission mechanism 35 is, as shown in FIG. 2, arranged in the inside of the sub transmission casing 38, wherein a sub transmission shaft 91 is interlockingly connected with a rear-end extending portion 81c of the main-transmission main shaft 81 which is extended to a front portion in the inside of the sub transmission casing 38 by way of a planetary gear mechanism 90.

Here, a sun gear 92 which constitutes a portion of the planetary gear mechanism 90 is mounted on the rear-end extending portion 81c of the main-transmission main shaft 81. On the other hand, the sub transmission shaft 91 is arranged coaxially with the main-transmission main shaft 81, has a midst portion thereof supported on a shaft support body 93 disposed in the inside of the sub transmission casing 38 by way of a bearing 94, and has a rear end portion thereof supported on a shaft support wall 95 formed in the inside of the differential casing 39 described later by way of a bearing 96.

Further, between an outer peripheral surface of the sun gear 92 and an outer peripheral surface of the front end portion of the sub transmission shaft 91, a cylindrical shift gear support body 97 is provided by spline fitting in an axially shiftable manner, a distal end portion of a shift fork 98 is engaged with the shift gear support body 97, and a sub transmission lever 99 which is mounted on an upper portion of the sub transmission casing 38 is interlockingly connected with a proximal end portion of the shift fork 98. Due to such a constitution, by manipulating the sub transmission lever 99, it is possible to perform the sub transmission.

That is, the above-mentioned constitution allows the sub transmission in which the power is directly transmitted to the sub transmission shaft 91 from the main-transmission main shaft 81 and the sub transmission in which the power is transmitted to the sub transmission shaft 91 from the main-transmission shaft 81 by way of the planetary gear mechanism 90.

Further, an opening portion 100 is formed in a bottom portion of the sub transmission casing 38, a front wheel driving power-take-out portion 101 is mounted by way of the opening portion 100, and a power-take-out shaft 102 which is mounted on the front wheel driving power-take-out portion 101 and the sub transmission shaft 91 which is provided to the above-mentioned sub transmission mechanism 35 are interlockingly connected with each other by way of a transmission gear group 103.

The differential mechanism 36 is, as shown in FIG. 2, arranged in the inside of the differential casing 39, a rear end portion of the above-mentioned sub transmission shaft 91 is extended to a front portion in the inside of the differential casing 39, an output bevel gear 105 is integrally formed with the rear end portion, and the differential mechanism 36 is meshed with and connected with the output bevel gear 105.

Further, rear axle power transmission mechanisms (not shown in the drawings) which are respectively disposed in the inside of the respective rear axle casings 8, 8 are interlockingly connected with the differential mechanism 36, and rear wheels 9, 9 are mounted on the respective rear axle power transmission mechanisms by way of the rear axles (not shown in the drawings).

Further, in the differential casing 39, an opening portion 106 for maintenance is formed in a ceiling portion thereof, a mounting support frame body 107 is mounted on a peripheral portion of the opening portion 106, a hydraulic circuit body 108 is mounted on a front portion of the mounting support frame body 107, and a hydraulic control valve 109 is mounted on the hydraulic circuit body 108. Further, proximal end portions of a pair of left and right lift arms 111, 111 are mounted on a rear portion of the mounting support frame body 107 by way of a lift arm support shaft 110. Lift cylinders 112, 112 which extend vertically are interposed between midst portions of the respective lift arms 111, 111 and left and right side portions of the PTO transmission portion 6 described later, and the above-mentioned hydraulic circuit body 108 is connected to the respective lift cylinders 112, 112 by way of hydraulic pipes (not shown in the drawings).

[Driving Portion 5]

In the driving portion 5, as shown in FIG. 1, a steering column 113 is mounted upright at a position behind the prime mover portion 2 and, at the same time, at a position above the clutch portion 3, a steering wheel 115 is mounted on an upper end portion of the steering column 113 by way of a wheel support shaft 114, a driver's seat 116 is arranged at a position behind the steering wheel 115, and the above-mentioned main transmission lever 88 and sub transmission lever 99 are arranged in a concentrated manner at a position disposed on a side of the driver's seat 116.

[PTO Transmission Portion 6]

Figure 5:
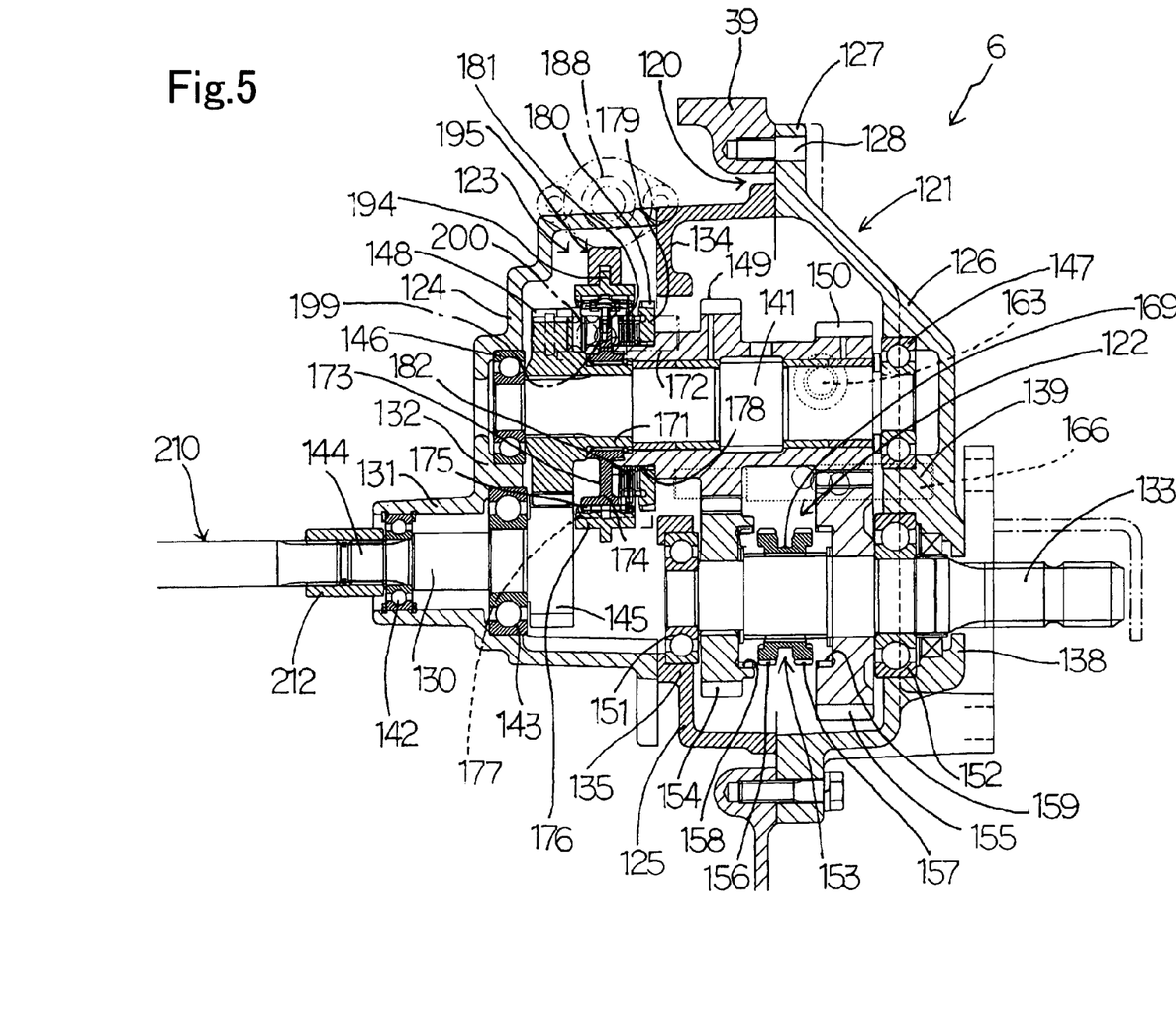
FIG. 5 is an explanatory cross-sectional side view of a PTO transmission portion.
Figure 6:
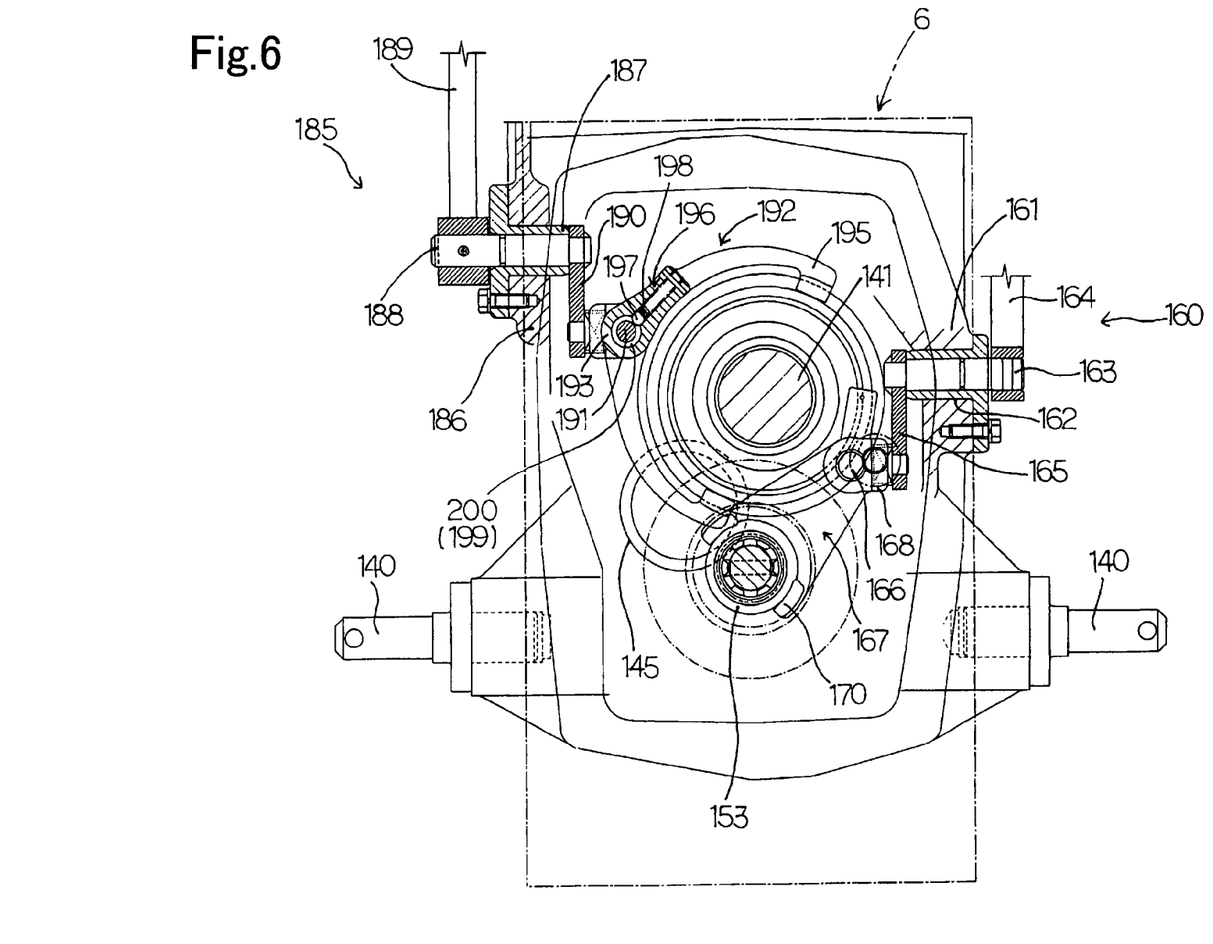
FIG. 6 is an explanatory cross-sectional back view of a PTO transmission portion.

In the PTO transmission portion 6, as shown in FIG. 5 and FIG. 6, in an opening portion 120 which is formed in a rear end of the differential casing 39, a PTO case 121 is detachably mounted, and a PTO transmission mechanism 122 and a PTO clutch mechanism 123 are arranged in the inside of the PTO case 121.

Hereinafter, the respective constitutions of [the PTO case 121], [the PTO transmission mechanism 122] and [the PTO clutch mechanism 123] are explained in this order in conjunction with FIG. 5 and FIG. 6.

[PTO Case 121]

The PTO case 121 has, as shown in FIG. 5 and FIG. 6, the three-split constitution consisting of a front case forming body 124, an intermediate case forming body 125 and a rear casing forming body 126, wherein the respective case forming bodies 124, 125, 126 are detachably connected with each other, the front case forming body 124 and the intermediate case forming body 125 are arranged in a state that these case forming bodies are housed in the inside of the differential casing 39, and the rear casing forming body 126 is arranged in a state that the rear casing forming body 126 is bulged rearwardly from the differential casing 39.

Further, a flange-like mounting member 127 is integrally formed by molding on a peripheral portion of a front end of the rear casing forming body 126, and the mounting member 127 is brought into contact with a peripheral portion of a rear end of the differential casing 39 from behind. Further, the mounting member 127 is mounted on the differential casing 39 using mounting bolts 128 which have axes thereof directed in the longitudinal direction.

In this manner, the PTO case 121 is detachably mounted in the opening portion 120 which is formed in the rear end of the differential casing 39 and hence, in a state that the PTO case 121 is removed from the differential casing 39, it is possible to easily perform the assembling operation and maintenance operation of the PTO transmission mechanism 122 and the PTO clutch mechanism 123 which are housed in the inside of the PTO case 121.

Further, in the PTO case 121, the front case forming body 124 and the intermediate case forming body 125 are mounted in a state that the front case forming body 124 and the intermediate case forming body 125 are housed in the inside of the differential casing 39 and hence, the transmission casing 30 can be miniaturized (or made compact).

In the inside of the front case forming body 124, an input shaft projecting opening portion 131 for receiving an input shaft 130 is formed in a state that the opening portion 131 opens in the longitudinal direction, and a transmission-shaft-front-portion receiving portion 132 is formed at a position above the above-mentioned input shaft projecting opening portion 131.

A shaft receiving member 134 which receives a front end portion of the PTO shaft 133 is provided in the inside of the intermediate case forming body 125, and the shaft receiving member 134 forms a PTO shaft front-portion receiving portion 135 which opens in the longitudinal direction in a midst portion thereof.

A PTO shaft projecting opening portion 138 is formed in the rear casing forming body 126 in a state that the PTO shaft projecting opening portion 138 is opened in the longitudinal direction, and a transmission-shaft rear-portion receiving portion 139 is formed at a position above the PTO shaft projecting opening portion 138.

Further, the input-shaft projecting opening portion 131 which is formed in the front case forming body 124, the PTO-shaft front-portion receiving portion 135 which is formed in the intermediate case forming body 125 and, the PTO-shaft projecting opening portion 138 which is formed in the rear casing forming body 126 are formed communicably with each other on the same axis which extends in the longitudinal direction.

Further, the transmission-shaft front-portion receiving portion 132 which is formed in the front case forming body 124 and the transmission-shaft rear-portion receiving portion 139 which is formed in the rear casing forming body 126 are arranged to face each other in an opposed manner in the longitudinal direction.

Further, on left and right side walls of the rear casing forming body 126, as shown in FIG. 2, lift cylinder support shafts 140, 140 which constitute a lift cylinder mounting portion are formed in a state that these lift cylinder support shafts 140, 140 project in the outer sideward direction and, a lower end portion of the lift cylinders 112, 112 are supported by the respective lift cylinder support shafts 140, 140.

[PTO Transmission Mechanism 122]

The PTO transmission mechanism 122 is configured as shown in FIG. 5 and FIG. 6, wherein in the inside of the above-mentioned PTO case 121, an input shaft 130, a transmission shaft 141 and the PTO shaft 133 which respectively have axes thereof directed in the longitudinal direction are arranged.

That is, the input shaft 130 is rotatably supported in the input shaft projecting opening portion 131 formed in the front case forming body 124 of the PTO case 121 by way of bearings 142, 143, while the input shaft 130 has a distal end portion 144 thereof projected forwardly and mounts an output gear 145 on a rear end portion thereof.

Further, between the transmission-shaft front-portion receiving portion 132 which is formed on the front case forming body 124 and the transmission-shaft rear-portion receiving portion 139 which is formed on the rear casing forming body 126, the transmission shaft 141 is rotatably supported by way of bearings 146, 147. A large-diameter input gear 148, and a second transmission gear 149 and a first transmission gear 150 which are integrally formed with each other are coaxially mounted on the transmission shaft 141 in order from a front side to a rear side, wherein the large-diameter input gear 148 is meshed with the output gear 145 mounted on the above-mentioned input shaft 130.

Further, between the PTO-shaft front-portion receiving portion 135 which is formed in the intermediate case forming body 125 and the PTO-shaft projecting opening portion 138 which is formed in the rear casing forming body 126, the PTO shaft 133 is rotatably supported by way of bearings 151, 152.

Further, a shift gear body 153 is mounted on the intermediate portion of the PTO shaft 133 in spline fitting such that the shift gear body 153 is shifted slidably in the axial direction and, at the same time, a second input gear 154 and a first input gear 155 are rotatably mounted on a front position and a rear position of the shift gear body 153. While a second side shift gear 156 and a first side shift gear 157 are mounted on the shift gear body 153, on a rear surface of the second input gear 154, a second fitting/meshing gear 158 into which the above-mentioned second side shift gear 156 is fitted and with which the second side shift gear 156 is meshed is formed. Further, on a front surface of the first input gear 155, a first fitting/meshing gear 159 into which the above-mentioned first side shift gear 157 is fitted and with which the first side shift gear 157 is meshed is formed.

Due to such a constitution, when the first side shift gear 157 is fitted in and meshed with the first fitting/meshing gear 159 of the first input gear 155 by shifting the shift gear body 153 rearwardly, the power which is subjected to the first transmission (low speed step) is transmitted to the PTO shaft 133 by way of the input shaft 130→the output gear 145→the large-diameter input gear 148→the PTO clutch mechanism 123 described later→the second transmission gear 149 and the first transmission gear 150 which are integrally formed→the first input gear 155→the first fitting/meshing gear 159→the first side shift gear 157→the shift gear body 153→and the PTO shaft 133.

Further, when the second side shift gear 156 is fitted in and meshed with the second fitting/meshing gear 158 of the second input gear 154 by shifting the shift gear body 153 frontwardly, the power which is subjected to the second transmission (high-speed step) is transmitted to the PTO shaft 133 by way of the input shaft 130→the output gear 145→the large-diameter input gear 148→the PTO clutch mechanism 123 described later→the second transmission gear 149 and the first transmission gear 150 which are integrally formed→the second input gear 154→the second fitting/meshing gear 158→the second side shift gear 156→the shift gear body 153→the PTO shaft 133.

Further, in the shift gear body 153, as shown in FIG. 6, a PTO transmission manipulation mechanism 160 is interlockingly connected.

That is, in the PTO transmission manipulation mechanism 160, a transmission manipulation support shaft 163 which has an axis thereof directed in the lateral direction is pivotally supported on a right side wall 161 of the rear casing forming body 126 by way of a boss portion 162, a proximal end portion of a PTO transmission manipulation arm 164 is mounted on an outer end portion of the transmission manipulation support shaft 163 which is outwardly projected from the right side wall 161, and a proximal end portion of an operation arm 165 is mounted on an inner end portion of the transmission manipulation support shaft 163 which is inwardly projected from the right side wall 161.

Further, a shift fork support shaft 166 which has an axis thereof directed in the longitudinal direction is arranged at a position in the vicinity of the distal end portion of the above-mentioned operation arm 165, a proximal end portion 168 of a shift fork 167 is slidably mounted on the shift fork support shaft 166 in the lateral direction and, while the distal end portion of the above-mentioned operation arm 165 is connected with the proximal end portion 168, a proximal end fork portion 170 of the shift fork 167 is engaged with an engaging groove portion 169 which is formed in an outer peripheral surface of the shift gear body 153.

Further, a distal end portion of the PTO transmission manipulation arm 164 is interlockingly connected with a PTO transmission lever (not shown in the drawings) which is arranged at a position in the vicinity of the driver's seat 116 by way of an interlockingly connection mechanism (not shown in the drawings). Due to such a constitution, by manipulating the PTO transmission lever, it is possible to perform the shift operation of the shift gear body 153 thus enabling the PTO transmission.

[PTO Clutch Mechanism 123]

A PTO clutch mechanism 123 is, as shown in FIG. 5 and FIG. 6, detachably interposed between a cylindrical front boss body 171 which is rearwardly extended from the rear end surface of the above-mentioned large-diameter input gear 148 along an outer peripheral surface of the transmission shaft 141 and a cylindrical rear boss body 172 which is frontwardly extended from the front end surface of the above-mentioned second transmission gear 149 along an outer peripheral surface of the transmission shaft 141. The PTO clutch mechanism can perform the connection or disconnection of the large-diameter input gear 148 and the second transmission gear 149 while synchronizing rotational speeds of the gears 148, 149.

That is, the PTO clutch mechanism 123 is constituted as follows. A ring-shaped support body 173 is fitted on and integrally mounted on the outer peripheral surface of the front side boss body 171, a slidable support member 174 having a small-width ring shape in the longitudinal direction is mounted on an outer peripheral edge portion of the support body 173. A front engaging groove 175 which is extended in the longitudinal direction is formed on an outer peripheral surface of the slidable support member 174, while a ring-shaped slide engaging body 176 is fitted on an outer peripheral surface of the slidable support member 174. Further, an engaging projecting member 177 which is formed on an inner peripheral surface of the slide engaging body 176 is engaged with the above-mentioned front side engaging groove 175 thus allowing the slide engaging body 176 to be slidable in the longitudinal direction.

Further, a stepped recessed portion 178 is formed on an outer peripheral surface of the cylindrical rear boss body 172, a ring-shaped engaging body 179 is fitted on and integrally mounted on an outer peripheral surface of the stepped recessed portion 178, and a rear engaging groove 180 with which the engaging projecting member 177 of the slide engaging body 176 is engaged is formed on an outer peripheral surface of the ring-shaped engaging body 179.

Due to such a constitution, when the slide engaging body 176 is made to slide rearwardly so as to engage the engaging projecting member 177 of the slide engaging body 176 with both of the front side engaging groove 175 and the rear side engaging groove 180 in a state that the engaging projecting member 177 is extended between the front side engaging groove 175 and the rear side engaging groove 180, it is possible to interlockingly connect the large-diameter input gear 148 and the second transmission gear 149.

Accordingly, in such a state, a rotational power of the large-diameter input gear 148 which forms a rotation side is transmitted to the second transmission gear 149 by way of the front side boss body 171→the front side engaging groove 175 which is formed on the slidable support member 174 of the support body 173→the engaging projecting member 177 which is formed on the slide engaging body 176→the rear side engaging groove 180 which is formed on the engaging body 179→the stepped recessed portion 178 which is formed on the rear boss body 172→the second transmission gear 149 and hence, the second transmission gear 149 is also integrally rotated.

Further, outer peripheral portions of a plurality of ring-like movable-side clutch plates 181 are mounted on a rear portion of an inner peripheral surface of the slide engaging body 176 in an axially slidable manner, while a plurality of ring-like fixed-side clutch plates 182 are mounted in a fitting state on an outer peripheral surface of a stepped recessed portion 178 in an axially spaced-apart manner at a given interval, and the movable-side clutch plates 181 are interposed one by one between these neighboring fixed-side clutch plates 182, 182.

In this manner, when the slide engaging body 176 is made to slide rearwardly, the movable-side clutch plate 181 is gradually pushed to the fixed-side clutch plates 182, 182 and a rotational force of a large-diameter input gear 148 which constitutes a rotation side is gradually transmitted to a second transmission gear 149 which constitutes a stop side. In a state that a rotational speed of the second transmission gear 149 is synchronized with the rotational speed of the large-diameter input gear 148, an engaging projecting member 177 of the slide engaging body 176 is engaged with a rear engaging groove 180 of an engaging body 179. As a result, the engagement between the engaging projecting member 177 and the rear engaging groove 180 is smoothly and surely performed thus preventing the generation of uncomfortable sounds.

Here, the PTO clutch mechanism 123 is detachable mounted on the PTO transmission portion 6 and hence, it is possible to provide the specification (see FIG. 5) which includes the PTO clutch mechanism 123 and the specification which does not include the PTO clutch mechanism 123 (see FIG. 9) in a state that the PTO transmission portion 6 is used in common.

Further, the PTO clutch mechanism 123 is detachably mounted on the PTO transmission portion 6 and the PTO transmission portion 6 is detachably mounted on the transmission portion 4 and hence, it is possible to easily perform the assembling operation as well as the disassembling operation thus realizing the easy maintenance operation.

Further, a PTO clutch manipulation mechanism 185 is, as shown in FIG. 6, interlockingly connected with the slide engaging body 176.

That is, in the PTO clutch manipulation mechanism 185, a clutch manipulation support shaft 188 which has an axis thereof directed in the lateral direction is pivotally supported on a left side wall 186 of the rear casing forming body 126 by way of a boss portion 187, a proximal end portion of a PTO clutch manipulation arm 189 is mounted on an outer end portion of the clutch manipulation support shaft 188 which is projected outwardly from the left side wall 186, and a proximal end portion of a clutch operation arm 190 is mounted on an inner end portion of the clutch manipulation support shaft 188 which is projected inwardly from the left side wall 186.

Further, a slide fork support shaft 191 which has an axis thereof directed in the longitudinal direction is arranged at a position in the vicinity of a distal end portion of the above-mentioned clutch operation arm 190, and a proximal end portion 193 of a slide fork 192 is mounted on the slide fork support shaft 191 in a state that the proximal end portion 193 is slidable in the longitudinal direction. Further, a distal end portion of the clutch operation arm 190 is connected to the proximal end portion 193, and a distal-end fork portion 195 of the slide fork 192 is engaged with an engaging projecting member 194 which is formed on an outer peripheral surface of the slide engaging body 176.

Further, on the proximal end portion 193 of the slide fork 192, as shown in FIG. 6, a temporary stopper body 196 is mounted, wherein the temporary stopper body 196 includes a temporary stopper ball 197 which is arranged in a reciprocating manner toward the inside of the proximal end portion 193 and a pusher spring 198 which resiliently biases the temporary stopper ball 197 in the advancing direction.

Further, in an outer peripheral surface of the slide fork support shaft 191 on which the proximal end portion 193 of the slide fork 192 is fitted, a connection holding engaging groove 199 and a disconnection holding engaging groove 200 with which the pusher spring 198 is engaged are formed.

Further, a distal end portion of the above-mentioned PTO clutch manipulation arm 189 is interlockingly connected with a PTO clutch lever (not shown in the drawing) which is arranged at a position in the vicinity of a driver's seat 116 by way of an interlockingly connecting mechanism (not shown in the drawing), wherein by manipulating the PTO clutch lever, it is possible to slidably operate the slide engaging body 176 so as to perform the clutch connection/disconnection manipulation.

In this case, during the clutch connection manipulation, the pushing spring 198 is engaged with the connection holding engaging groove 199 of the slide fork support shaft 191 so as to hold the clutch connection state.

Further, during the clutch disconnection manipulation, the pushing spring 198 is engaged with the disconnection holding engaging groove 200 of the slide fork support shaft 191 so as to hold the clutch disconnection state.

Here, the PTO clutch lever is manually manipulated. Due to the manual manipulation of the PTO clutch lever, the movable-side clutch plate 181 and the fixed-side clutch plate 182 are brought into pressure contact with each other and the clutch connection manipulation can be performed while delicately synchronizing the rotational speeds of the large-diameter input gear 148 and the second transmission gear 149 and hence, it is possible to ensure the smooth and reliable connecting manipulation and the prevention of occurrence of uncomfortable sounds or the like.

Further, the distal end portion 144 of the above-mentioned input shaft 130 is, as shown in FIG. 2, interlockingly connected with the drive shaft 18 by way of the PTO-system power transmission shaft 210 thus forming the PTO-system power transmission mechanism 32, wherein the PTO-system power transmission shaft 210 has a front portion to a rear portion thereof arranged in the inside of the transmission casing 30 in a state that an axis thereof is directed in the longitudinal direction.

(PTO-System Power Transmission Shaft 210)

The PTO-system power transmission shaft 210 is, as shown in FIG. 2, configured such that a front end portion thereof is pivotally supported on the support wall body 21 of the clutch housing 17 by way of a bearing 211, while a rear end portion thereof is interlockingly connected with a distal end portion 144 of the above-mentioned input shaft 130 by way of a connection sleeve 212.

Further, an input gear 213 is mounted on a front end portion of the PTO-system power transmission shaft 210, while the input gear 213 is meshed with the distribution power transmission gear 29 which is integrally formed with the drive shaft 18.

Here, the power-take-out gear 214 is mounted on a front portion of the PTO-system power transmission shaft 210 and the power can be taken out to the outside from the power-take-out gear 214 through a power-take-out opening portion 215 which is formed in a left side wall of the main transmission casing 37.

Further, a one way clutch 216 is mounted on a rear portion of the PTO-system power transmission shaft 210.

In this manner, the power transmitted to the drive shaft 18 from the engine 15 is transmitted to the input shaft 130 by way of the distribution power transmission gear 29 which is integrally formed on the drive shaft 18→the input gear 213→the PTO-system power transmission shaft 210→the input shaft 130.

Figure 7:
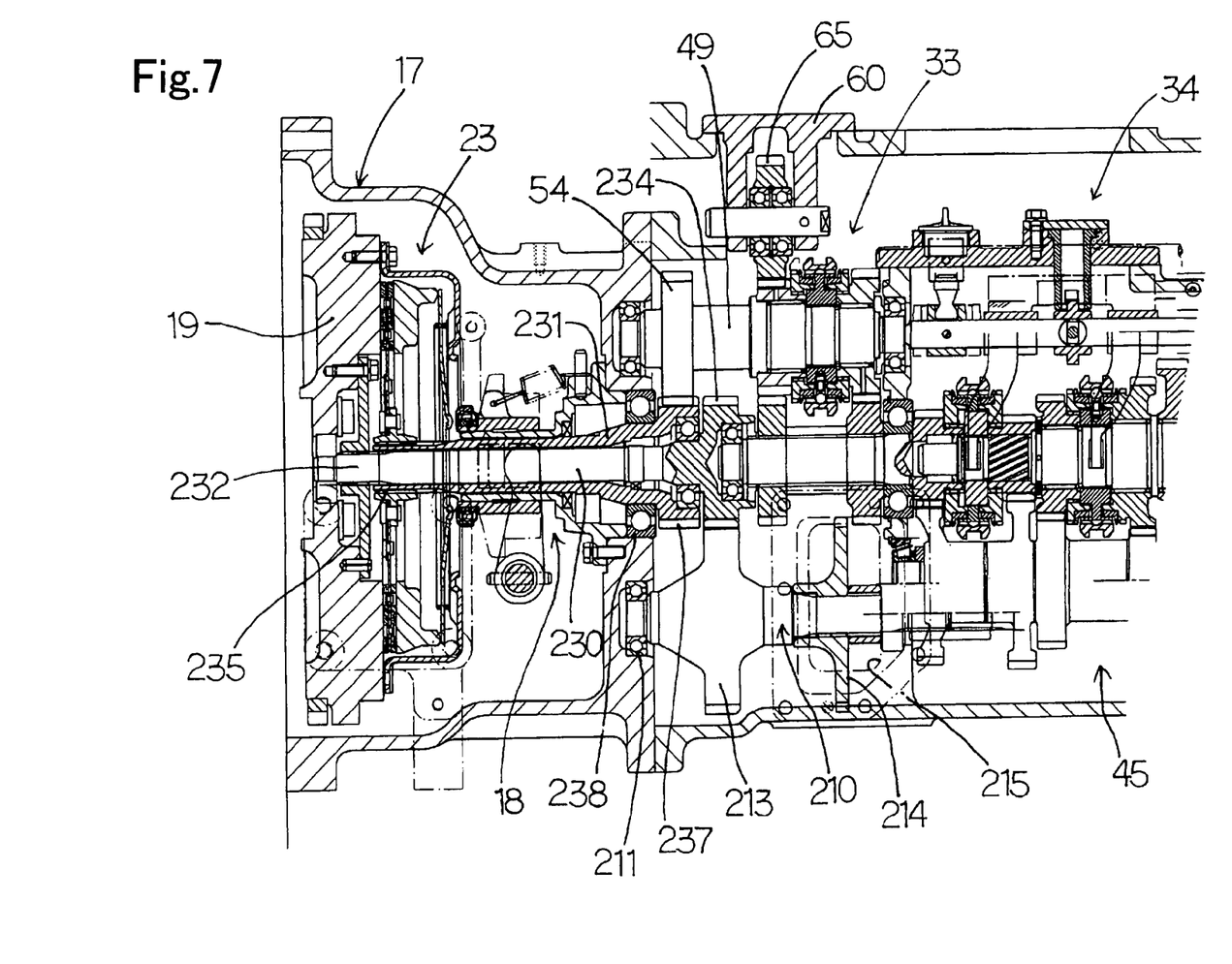
FIG. 7 is an explanatory cross-sectional side view of a drive shaft of a second embodiment.

FIG. 7 shows a drive shaft 18 of the second embodiment. This drive shaft 18 has the basic structure which is equal to the basic structure of the drive shaft 18 of the above-mentioned first embodiment. However, the driveshaft 18 of this embodiment differs from the drive shaft 18 of the first embodiment with respect to a point that the drive shaft 18 has the inner-outer duplicate shaft structure which is constituted of an inner drive shaft forming body 230 which extends in the longitudinal direction and a cylindrical outer drive shaft forming body 231 which is rotatably fitted on an outer periphery of the inner drive shaft forming body 230.

Further, in the inner drive shaft forming body 230, a front end portion 232 is interlockingly connected with the flywheel 19, a PTO distribution power transmission gear 234 is integrally formed on a rear end portion 233, and the input gear 213 which is integrally formed on the front end portion of the PTO-system power transmission shaft 210 is meshed with the PTO distribution power transmission gear 234.

Further, in the outer drive shaft forming body 231, a front end portion 235 is interlockingly connected with the clutch 23, a traveling distribution power transmission gear 237 is integrally formed on a rear end portion 236, and the distribution input gear 54 which is mounted on the advancing/backing changeover output shaft 49 is meshed with the traveling distribution power transmission gear 237. Numeral 238 indicates a bearing.

Here, the PTO distribution power transmission gear 234 and the traveling distribution power transmission gear 237 are arranged in a compact manner by arranging these power transmission gears 234, 237 close to each other coaxially and longitudinally.

Figure 8:
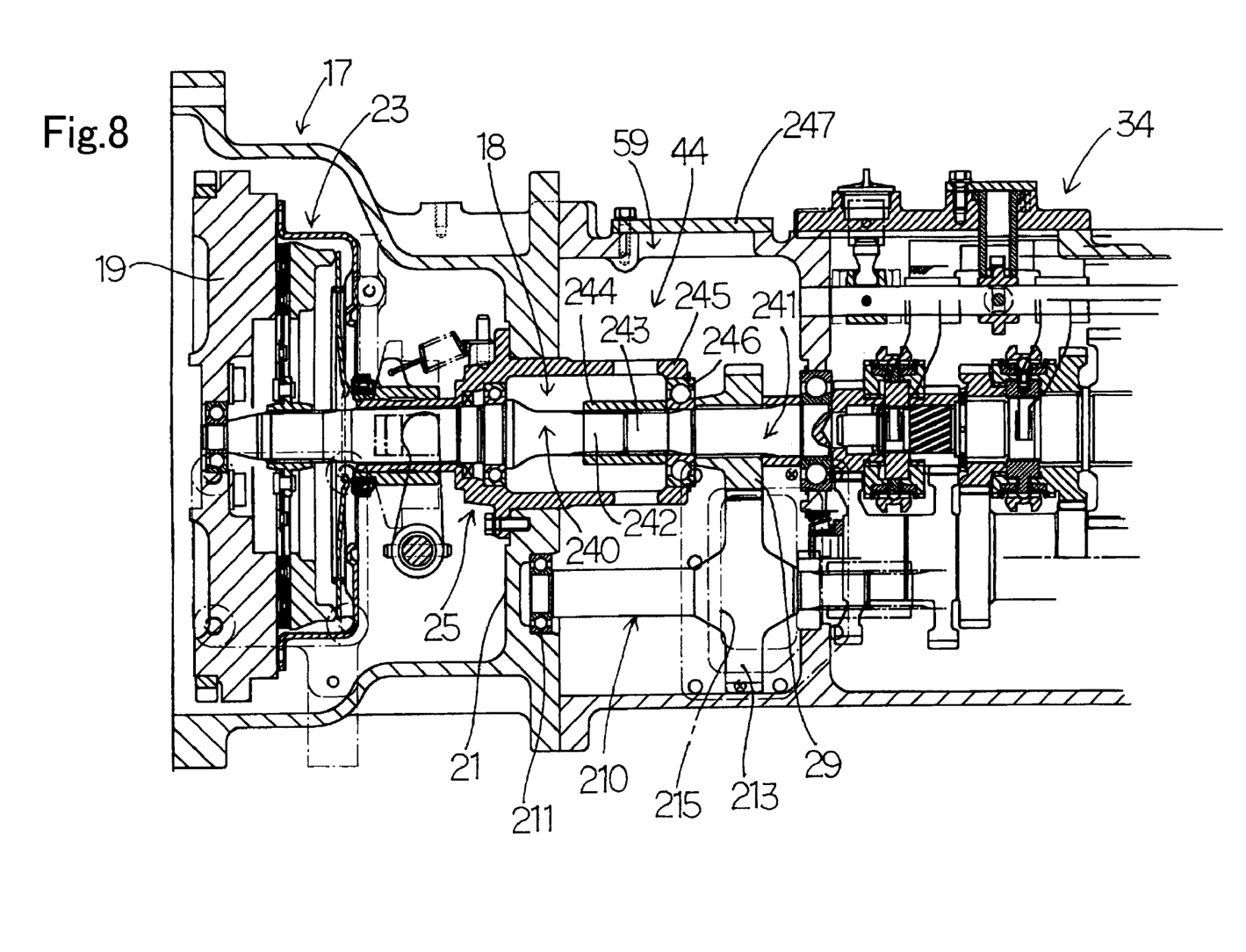
FIG. 8 is an explanatory cross-sectional side view of a drive shaft of a third embodiment.

FIG. 8 shows a drive shaft 18 of the third embodiment. This drive shaft 18 has the basic structure which is equal to the basic structure of the drive shaft 18 of the above-mentioned first embodiment. However, the drive shaft 18 of this embodiment differs from the drive shaft 18 of the first embodiment with respect to a point that the drive shaft is split in two, that is, a front-half drive shaft forming body 240 and a rear-half drive shaft forming body 241 and, at the same time, a rear end portion 242 of the front-half drive shaft forming body 240 and front end portion 243 of the rear-half drive shaft forming body 241 are interlockingly connected with each other coaxially by way of a cylindrical connecting body 244.

Further, a cylindrical support member 25 which supports a midst portion of the front half drive shaft forming body 240 is allowed to penetrate the support wall body 21 formed along a rear-end peripheral portion of the clutch housing 17 and, at the same time, is extended to the inside of the front chamber 44 of the rear main transmission casing 37 in a cylindrical shape, and a front portion of the rear half drive shaft forming body 241 is rotatably supported on a rear end portion 245 by way of a bearing 246.

Further, the distribution power transmission gear 29 is integrally mounted on a midst portion of the rear half drive shaft forming body 241 which is positioned right behind the above-mentioned bearing 246, while the input gear 213 which is integrally formed on the front portion of the PTO-system power transmission shaft 210 is meshed with the distribution power transmission gear 29.

Here, the input gear 213 is arranged in the vicinity of the power-take-out opening portion 215 formed in the left side wall of the main transmission case 37 so as to allow the takeout of the power to the outside from the input gear 213 through the power-take-out opening portion 215.

Further, the drive shaft 18 of the second embodiment adopts the specification which is not provided with the advancing/backing changeover mechanism 68 and the opening portion 59 is closed with a closure lid body 247.

Accordingly, in the specification which is provided with the advancing/backing changeover mechanism 68, the drive shaft 18 of the first embodiment or the second embodiment is mounted, while in the specification which is not provided with the advancing/backing changeover mechanism 68, it is possible to change the specification by mounting the drive shaft 18 of the third embodiment.

Figure 9:
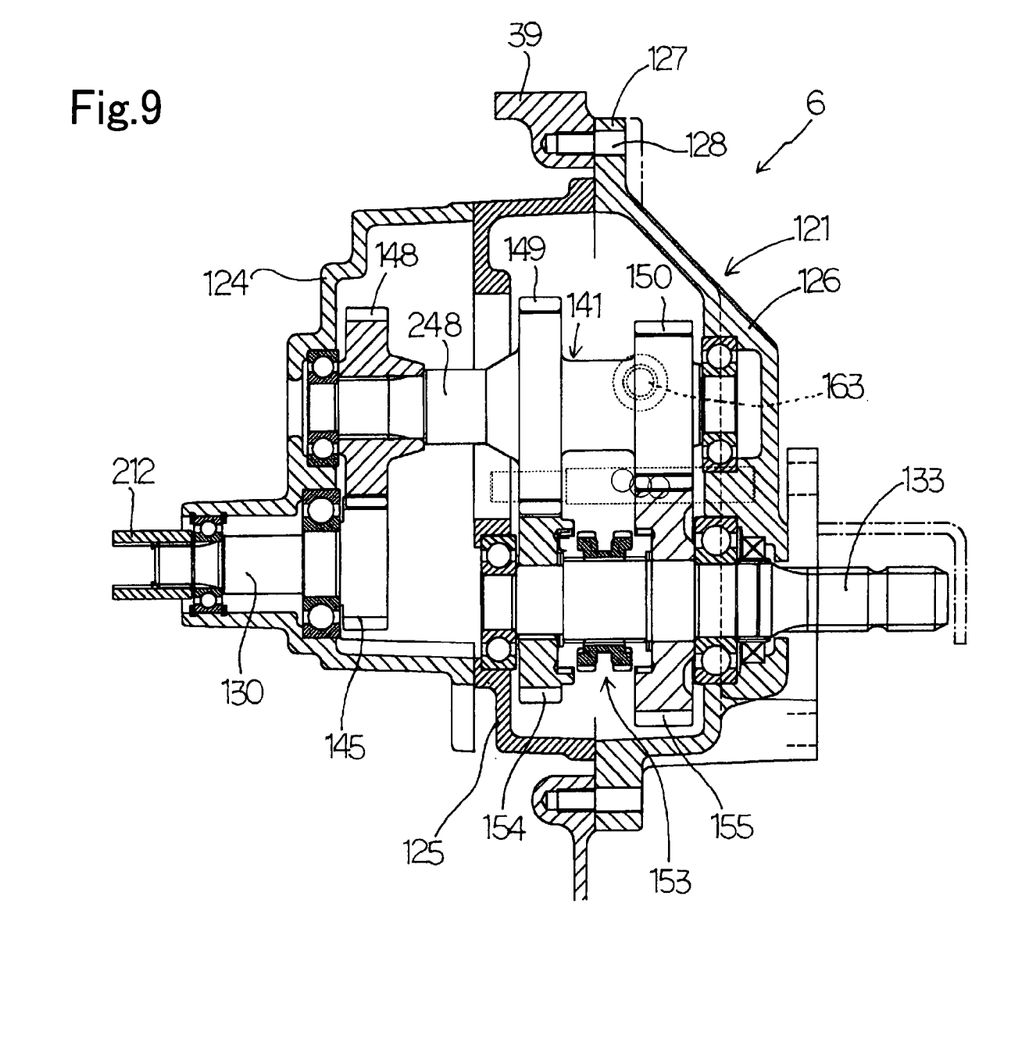
FIG. 9 is an explanatory cross-sectional side view of a transmission shaft of the second embodiment.

FIG. 9 shows a transmission shaft 141 of the second embodiment. Although the transmission shaft 141 of this embodiment has the basic structure which is equal to the basic structure of the first embodiment, this embodiment differs from the first embodiment with respect to a point that the transmission shaft 141 of this embodiment is not provided with the PTO clutch mechanism 123.

That is, in the transmission shaft 141, a shaft body 248, the second transmission gear 149 and the first transmission gear 150 are integrally formed and the large-diameter input gear 148 is integrally mounted on a front portion of the shaft body 248.

Accordingly, in the specification which includes the PTO clutch mechanism 123, the transmission shaft 141 of the first embodiment is provided, while in the specification which does not include the PTO clutch mechanism 123, the transmission shaft 141 is mounted in the second embodiment thus facilitating the change of the specification.

What is claimed is:

1. A tractor, comprising:
    a transmission portion;
    a PTO portion being configured to include a PTO case which is detachably mounted on an opening portion formed on a rear end portion of the transmission portion and a PTO clutch mechanism arranged in the inside of the PTO portion;
    a PTO transmission mechanism being disposed in an inside of the PTO case; and
    said PTO clutch mechanism being detachably mountable to the PTO case for disposition in the inside thereof such that the PTO portion is changeable between a first mode in which the PTO clutch mechanism is disposed in the inside of the PTO case and a second mode in which the PTO clutch mechanism is not disposed in the inside of the PTO case, the PTO case having a three-split constitution comprised of a front case forming body, an intermediate case forming body and a rear casing forming body;
    an input shaft rotatably supported on the front case forming body, and an output gear is mounted on a rear end portion of the input shaft;
    a transmission shaft rotatably supported on the front case forming body and the rear casing forming body, an input gear and a transmission gear, and the PTO clutch mechanism is provided between the input gear and the transmission gear; and
    a PTO shaft supported on the intermediate case forming body and the rear casing forming body, and a shift gear body and a shift gear are mounted on the PTO shaft.

2. A tractor according to claim 1, further comprising a manual manipulating jig which is interlockingly connected to the PTO clutch mechanism, the manual manipulating jig being arranged in a vicinity of a driver's seat.

* * * * *